United States Patent
Komuro et al.

(10) Patent No.: US 12,299,921 B2
(45) Date of Patent: May 13, 2025

(54) SELF-POSITION ESTIMATION DEVICE, MOVING BODY, SELF-POSITION ESTIMATION METHOD, AND SELF-POSITION ESTIMATION PROGRAM

(71) Applicants: KABUSHIKI KAISHA TOYOTA JIDOSHOKKI, Kariya (JP); National Institute of Advanced Industrial Science and Technology, Tokyo (JP)

(72) Inventors: Tatsuya Komuro, Kariya (JP); Norihiko Kato, Kariya (JP); Atsuhiko Banno, Tsukuba (JP); Masashi Yokozuka, Tsukuba (JP); Hiromu Onda, Tsukuba (JP)

(73) Assignees: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 207 days.

(21) Appl. No.: 17/785,613

(22) PCT Filed: Dec. 15, 2020

(86) PCT No.: PCT/JP2020/046766
§ 371 (c)(1),
(2) Date: Jun. 15, 2022

(87) PCT Pub. No.: WO2021/125171
PCT Pub. Date: Jun. 24, 2021

(65) Prior Publication Data
US 2023/0027659 A1    Jan. 26, 2023

(30) Foreign Application Priority Data
Dec. 19, 2019   (JP) ................. 2019-229498

(51) Int. Cl.
| | | |
|---|---|---|
| G06K 9/00 | (2022.01) |
| G06T 7/73 | (2017.01) |
| G06V 10/44 | (2022.01) |
| G06V 10/77 | (2022.01) |
| G06V 20/56 | (2022.01) |

(52) U.S. Cl.
CPC .............. *G06T 7/73* (2017.01); *G06V 10/443* (2022.01); *G06V 10/7715* (2022.01); *G06V 20/56* (2022.01)

(58) Field of Classification Search
CPC .... G06V 10/443; G06V 10/74; G06V 10/771; G06V 10/7715; G06V 10/776;
(Continued)

(56) References Cited

U.S. PATENT DOCUMENTS

2011/0043699 A1* 2/2011 Springett ................ G06T 7/143
348/E5.062
2012/0121161 A1 5/2012 Eade et al.
(Continued)

FOREIGN PATENT DOCUMENTS

JP    2015-210677 A    11/2015
JP    2016-157197 A    9/2016
(Continued)

OTHER PUBLICATIONS

International Search Report dated Mar. 9, 2021 in Application No. PCT/JP2020/046766.
(Continued)

*Primary Examiner* — Hadi Akhavannik
(74) *Attorney, Agent, or Firm* — Sughrue Mion, PLLC

(57) ABSTRACT

An own-position estimating device for estimating an own-position of a moving body by matching a feature extracted from an acquired image with a database in which position information and the feature are associated with each other in advance, includes an evaluation result acquiring unit acquiring an evaluation result obtained by evaluating matching
(Continued)

eligibility of the feature in the database, and a processing unit processing the database on the basis of the evaluation result acquired by the evaluation result acquiring unit.

6 Claims, 14 Drawing Sheets

(58) Field of Classification Search
CPC ............ G06V 10/778; G06V 10/7792; G06V 10/7796; G06V 20/56; G06T 7/70; G06T 7/73; G06T 2207/30244; G06T 2207/30252; G01C 21/30; G05D 1/0231; G05D 1/0246; G05D 1/2462
See application file for complete search history.

(56) References Cited

U.S. PATENT DOCUMENTS

| | | | |
|---|---|---|---|
| 2012/0213443 | A1 | 8/2012 | Shin et al. |
| 2016/0238394 | A1 | 8/2016 | Iimura et al. |
| 2018/0079085 | A1 | 3/2018 | Nakata et al. |
| 2019/0315314 | A1 | 10/2019 | Haneda et al. |
| 2020/0401617 | A1* | 12/2020 | Spiegel et al. ........ G06F 16/587 |
| 2023/0280465 | A1* | 9/2023 | Gruenwedel et al. .. G01S 13/89 356/4.01 |

FOREIGN PATENT DOCUMENTS

| | | |
|---|---|---|
| JP | 2017-21427 A | 1/2017 |
| JP | 2017-45447 A | 3/2017 |
| JP | 2018-109849 A | 7/2018 |
| WO | 2015/049717 A1 | 4/2015 |

OTHER PUBLICATIONS

Translation of the International Preliminary Report on Patentability (with translation of Written Opinion) dated Jun. 30, 2022 in International Application No. PCT/JP2020/046766.

Extended Search Report dated Jan. 9, 2023 from the European Patent Office in EP Application No. 20902586.5.

* cited by examiner

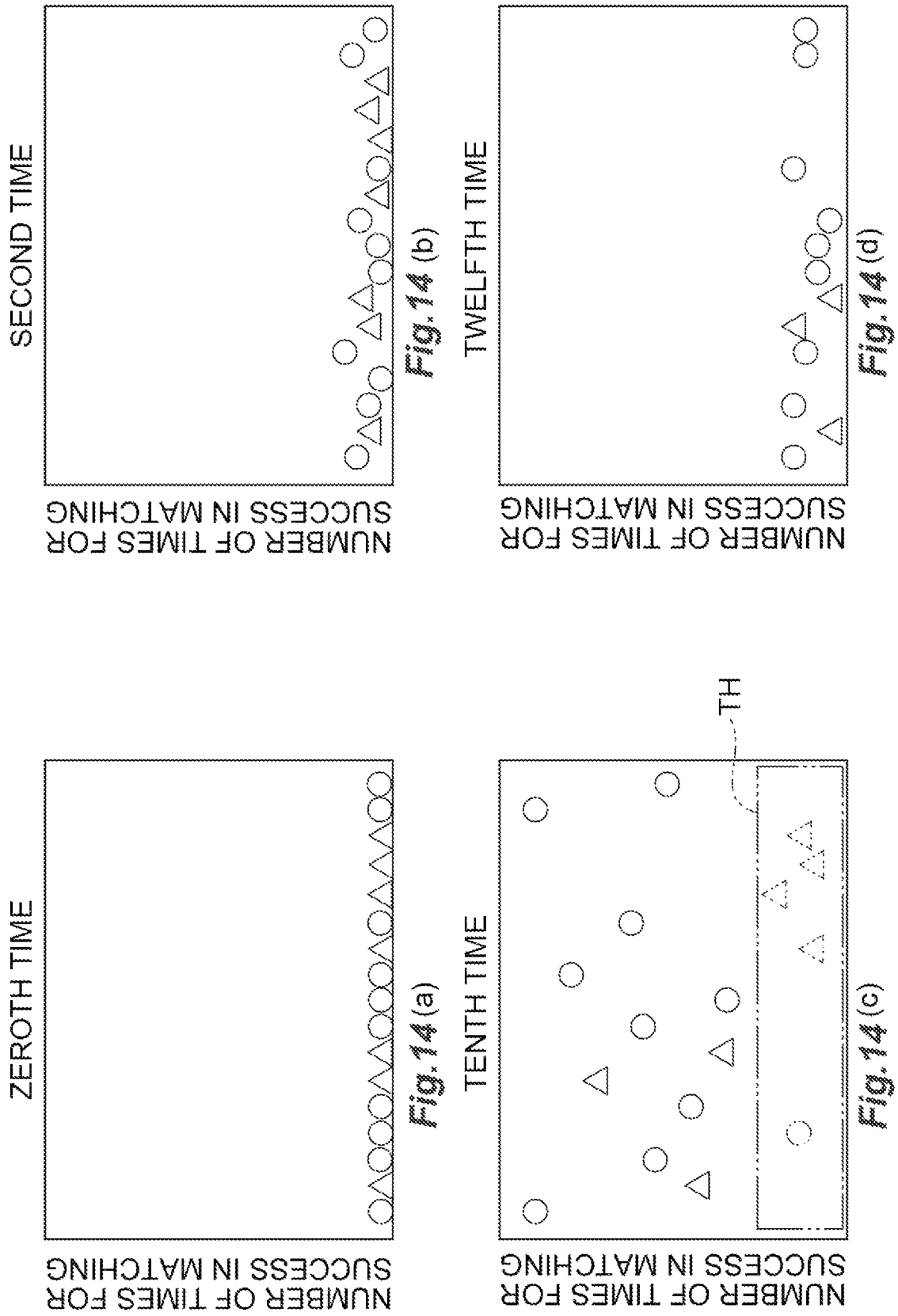

SELF-POSITION ESTIMATION DEVICE, MOVING BODY, SELF-POSITION ESTIMATION METHOD, AND SELF-POSITION ESTIMATION PROGRAM

CROSS REFERENCE TO RELATED APPLICATIONS

This application is a National Stage of International Application No. PCT/JP2020/046766 filed Dec. 15, 2020, claiming priority based on Japanese Patent Application No. 2019-229498 filed Dec. 19, 2019.

TECHNICAL FIELD

The present disclosure relates to an own-position estimating device, a moving body, an own-position estimating method, and an own-position estimating program.

BACKGROUND ART

An own-position estimating device described in Patent Literature 1 is known as an own-position estimating device of the related art. Such an own-position estimating device extracts feature points of an object from time-series images that are input in order from an image input unit, tracks the extracted feature points, and calculates a movement vector. Then, the own-position estimating device determines whether or not the feature point is a moving object, on the basis of the length and the direction of the calculated movement vector of the feature points. Then, in a case where it is determined that the feature point is the moving object, the own-position estimating device removes an object corresponding to the feature points from the time-series images, generates map information including the coordinates in a world coordinate system of an unremoved object of the feature points, and estimates the own-position on the basis of the generated map information.

CITATION LIST

Patent Literature

Patent Literature 1: Japanese Unexamined Patent Publication No. 2016-157197

SUMMARY OF INVENTION

Technical Problem

Here, in a logistics site or the like, cargoes arranged at the site are in a static state when preparing a database, but may be moved when estimating the own-position. The own-position estimating device of Patent Literature 1 is not capable of determining an object such as the cargo in the logistics site as a movable object. That is, the own-position may be estimated on the basis of the movable object having low matching eligibility as the feature, and the accuracy of the own-position estimation cannot be improved, which is a problem.

Accordingly, an object of the present disclosure is to provide an own-position estimating device, a moving body, an own-position estimating method, and an own-position estimating program, in which the accuracy of own-position estimation can be improved.

Solution to Problem

An own-position estimating device according to one aspect of the present disclosure is an own-position estimating device for estimating an own-position of a moving body by matching a feature extracted from an acquired image with a database in which position information and the feature are associated with each other in advance, the device including: an evaluation result acquiring unit acquiring an evaluation result obtained by evaluating matching eligibility of the feature in the database; and a processing unit processing the database on the basis of the evaluation result acquired by the evaluation result acquiring unit.

The own-position estimating device is for estimating the own-position of the moving body by matching the feature extracted from the acquired image with the database in which the position information and the feature are associated with each other in advance. Here, not only features of an immobile structural object such as a shelf, but also features of a movable object such as a cargo may be extracted when preparing the database in advance. In contrast, the evaluation result acquiring unit acquires the evaluation result obtained by evaluating the matching eligibility of the feature in the database. Accordingly, even in a case where a feature having low eligibility, as with the feature of the movable object such as the cargo, is included in the database, the evaluation result acquiring unit is capable of acquiring the evaluation result obtained by evaluating that such a feature has low eligibility. Further, the processing unit is capable of processing the database on the basis of the evaluation result acquired by the evaluation result acquiring unit. That is, the processing unit is capable of processing the database such that the matching is easily performed by features having high eligibility. As described above, the accuracy of the own-position estimation can be improved.

The own-position estimating device may further include: an image acquiring unit acquiring the image; an extracting unit extracting the feature from the image acquired by the image acquiring unit; an estimating unit estimating the own-position of the moving body by matching the feature extracted by the extracting unit with the database; and an evaluating unit evaluating the matching eligibility of the feature in the database. Accordingly, the own-position estimating device extracts and evaluates the feature on the basis of the image acquired by the own image acquiring unit, and is capable of processing the database.

The evaluation result acquiring unit may acquire the evaluation result obtained by the moving body repeatedly travelling in a predetermined region. Accordingly, it is possible for the processing unit to process the database by the moving body repeatedly travelling. Accordingly, it is possible to automatically improve the accuracy of the own-position estimation when the moving body is travelling.

The evaluation result acquiring unit may acquire the evaluation result obtained by machine learning. In this case, even in a case where the moving body does not actually travel repeatedly, it is possible to rapidly process the database.

The processing unit may decrease a frequency that the feature evaluated to have low eligibility is used in the matching, or may delete the feature from the database. As a result thereof, a ratio that the feature having high eligibility is used in the matching increases.

A moving body according to one aspect of the present disclosure includes the own-position estimating device described above.

An own-position estimating method according to one aspect of the present disclosure is an own-position estimating method for estimating an own-position of a moving body by matching a feature extracted from an acquired image with a database in which position information and the feature are associated with each other in advance, the method including: an evaluation result acquisition step of acquiring an evaluation result obtained by evaluating matching eligibility of the feature in the database; and a processing step of processing the database on the basis of the evaluation result acquired in the evaluation result acquisition step.

An own-position estimating program according to one aspect of the present disclosure is an own-position estimating program for estimating an own-position of a moving body by matching a feature extracted from an acquired image with a database in which position information and the feature are associated with each other in advance, the program allowing a controller to execute: an evaluation result acquisition step of acquiring an evaluation result obtained by evaluating matching eligibility of the feature in the database; and a processing step of processing the database on the basis of the evaluation result acquired in the evaluation result acquisition step.

According to the moving body, the own-position estimating method, and the own-position estimating program, it is possible to obtain the same effects as those of the own-position estimating device described above.

Advantageous Effects of Invention

According to the present disclosure, it is possible to provide an own-position estimating device, a moving body, an own-position estimating method, and an own-position estimating program, in which the accuracy of the own-position estimation can be improved.

BRIEF DESCRIPTION OF DRAWINGS

FIGS. 14(a), 14(b), 14(c), and 14(d) are graphs illustrating an integrated value of the number of times for success in the matching of each of the feature points in the database.

DESCRIPTION OF EMBODIMENTS

Hereinafter, an embodiment of the present disclosure will be described in detail with reference to the drawings.

Figure 1:
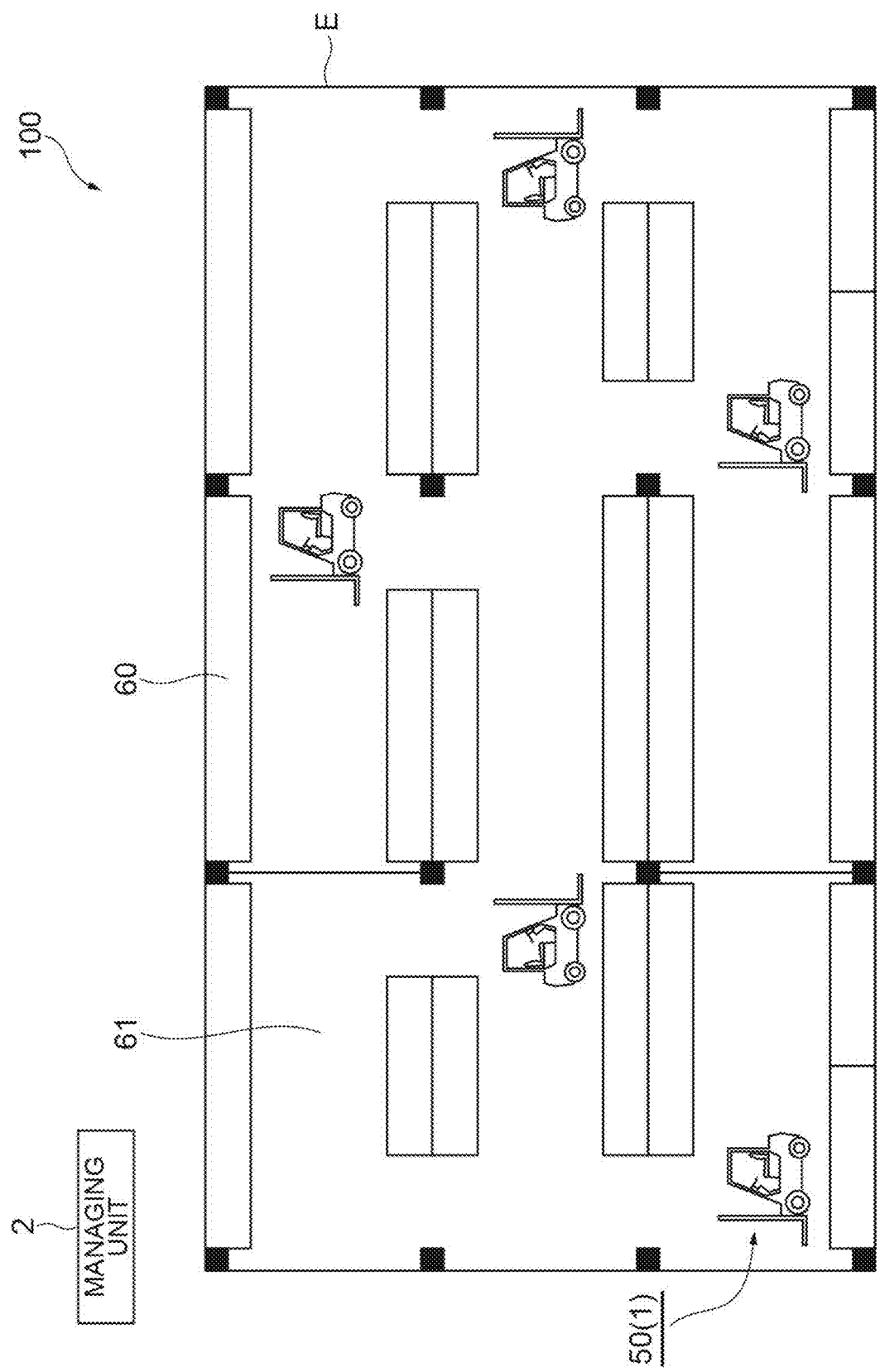
FIG. 1 is a schematic view illustrating an own-position estimating system including an own-position estimating device according to an embodiment of the present disclosure.

FIG. 1 is a schematic view illustrating an own-position estimating system 100 including an own-position estimating device 1 according to this embodiment. As illustrated in FIG. 1, the own-position estimating system 100 includes an own-position estimating device 1 provided in each of a plurality of moving bodies 50, and a managing unit 2.

In this embodiment, a forklift is exemplified as the moving body 50. In FIG. 1, a state is illustrated in which the forklift as the moving body 50 performs a cargo unloading operation in a workspace E (a predetermined region) such as a warehouse or a factory. In the workspace E, a plurality of shelves 60 are disposed. In addition, a passage 61 for the moving body 50 to pass through is formed between the shelf 60 and the shelf 60. The own-position estimating device 1 is a device estimating the own-position of the moving body 50 in the workspace E. The own-position estimating device 1 estimates the own-position of the moving body 50 by matching a feature extracted from an acquired image with a database in which position information and the feature are associated with each other in advance. The moving body 50 is capable of autonomously travelling in the workspace E by using the own-position estimated by the own-position estimating device 1. Note that, the detailed configuration of the own-position estimating device 1 will be described below. The managing unit 2 is a server managing the plurality of moving bodies 50 in the workspace E. The managing unit 2 receives predetermined information from the plurality of moving bodies 50, and transmits predetermined information to the plurality of moving bodies 50, as necessary.

Figure 2:
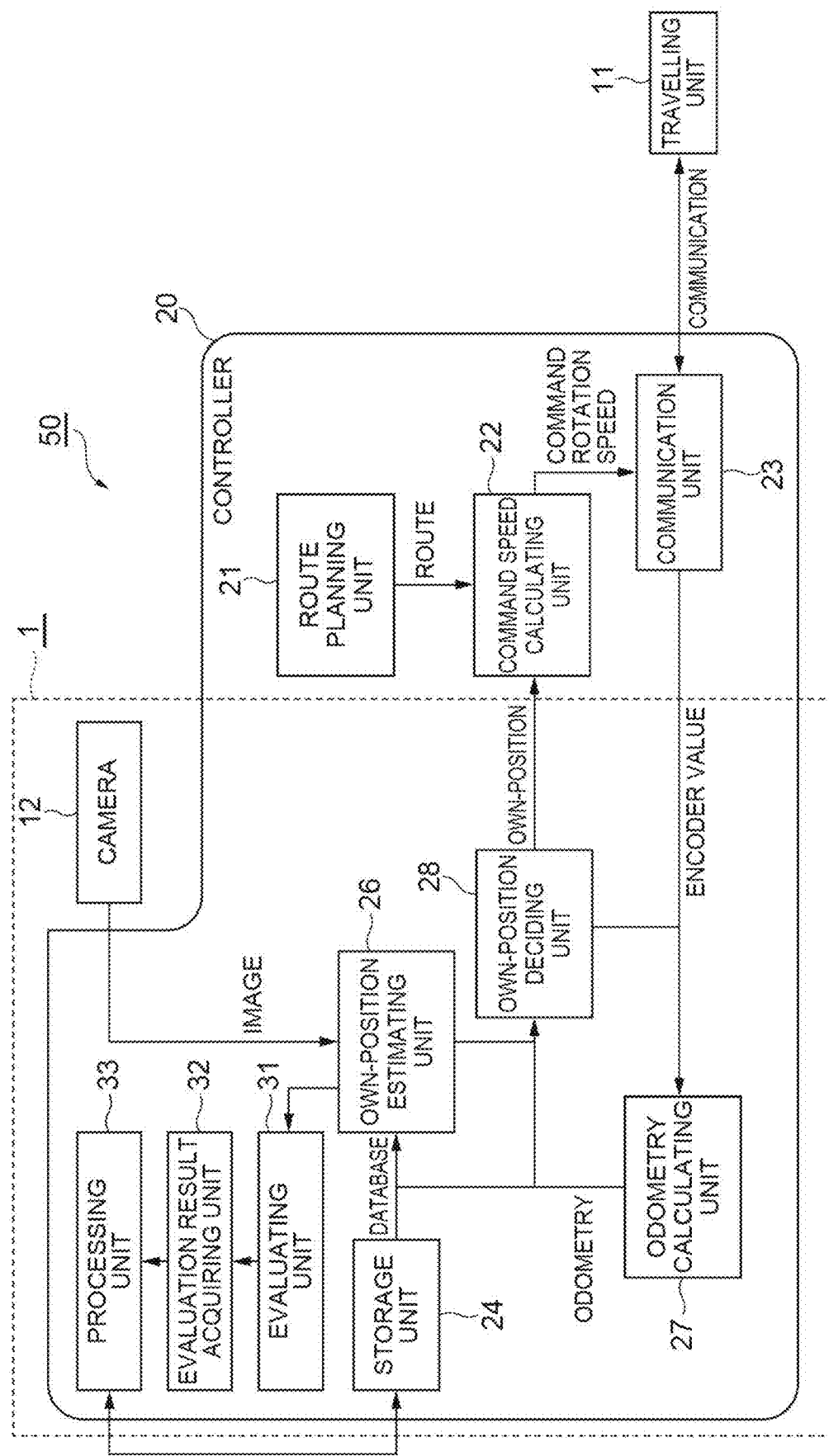
FIG. 2 is a block configuration diagram illustrating a block configuration of a moving body including the own-position estimating device according to the embodiment of the present disclosure.

FIG. 2 is a block configuration diagram illustrating a block configuration of the moving body 50 including the own-position estimating device 1 according to this embodiment. As illustrated in FIG. 2, the moving body 50 includes a travelling unit 11, a camera 12, and a controller 20. The travelling unit 11 is a driving system generating a driving force for the moving body 50 to travel, such as a motor. The camera 12 (an image acquiring unit) is a device acquiring the surrounding image of the moving body 50. The camera 12 transmits the acquired image to an own-position estimating unit 26.

The controller 20 includes an electronic control unit [ECU] comprehensively managing the moving body 50. ECU is an electronic control unit including a central processing unit [CPU], a read only memory [ROM], a random access memory [RAM], a controller area network [CAN] communication circuit, and the like. In ECU, for example, various functions are attained by loading a program stored in ROM to RAM, and by executing the program loaded to RAM in CPU. The controller 20 includes a route planning unit 21, a command speed calculating unit 22, a communication unit 23, a storage unit 24, the own-position estimating unit 26 (an extracting unit and an estimating unit), an odometry calculating unit 27, an own-position deciding unit 28, an evaluating unit 31, an evaluation result acquiring unit 32, and a processing unit 33. Among them, the storage unit 24, the own-position estimating unit 26, the odometry calculating unit 27, the own-position deciding unit 28, the evaluating unit 31, the evaluation result acquiring unit 32, the processing unit 33, and the camera 12 configure the own-position estimating device 1.

The route planning unit 21 plans a route for the moving body 50 to move. The route planning unit 21 sets a departure position and a destination position in the workspace E, and plans a route to the destination position. The route planning unit 21 transmits information of the planned route to the command speed calculating unit 22. The command speed calculating unit 22 calculates a command speed with respect to the travelling unit 11, that is, a command rotation speed with respect to the motor. The command speed calculating unit 22 calculates the command rotation speed on the basis of the route transmitted from the route planning unit 21 and the own-position transmitted from the own-position deciding unit 28. The communication unit 23 performs communication with respect to the travelling unit 11. The communication unit 23 transmits a control signal required for travel to the travelling unit 11. Note that, the communication unit 23 acquires an encoder value from an encoder that is not illustrated, and transmits the encoder value to the odometry calculating unit 27.

Next, each constituent of the own-position estimating device 1 will be described. The storage unit 24 stores the database required for own-position estimation. The database is an information group in which the position information and the feature extracted from the image acquired in the position are associated with each other in advance. The storage unit 24 transmits the database to the own-position estimating unit 26.

Returning to FIG. 2, the own-position estimating unit 26 extracts the feature from the image acquired by the camera 12. In addition, the own-position estimating unit 26 estimates the own-position of the moving body 50 by matching the feature extracted from the image acquired by the camera 12 with the database transmitted from the storage unit 24. The own-position estimating unit 26 transmits the estimated own-position to the own-position deciding unit 28.

The odometry calculating unit 27 calculates the own-position according to odometry on the basis of the encoder value acquired from the communication unit 23. The odometry calculating unit 27 is capable of acquiring the own-position by easy calculation without using the image of the camera 12. The odometry calculating unit 27 transmits the own-position according to odometry to the own-position deciding unit 28. The own-position deciding unit 28 comprehensively determines the own-position from the own-position estimating unit 26 and the own-position from the odometry calculating unit 27, and decides the own-position of the moving body 50. The own-position deciding unit 28 transmits the decided own-position to the command speed calculating unit 22.

Figure 3:
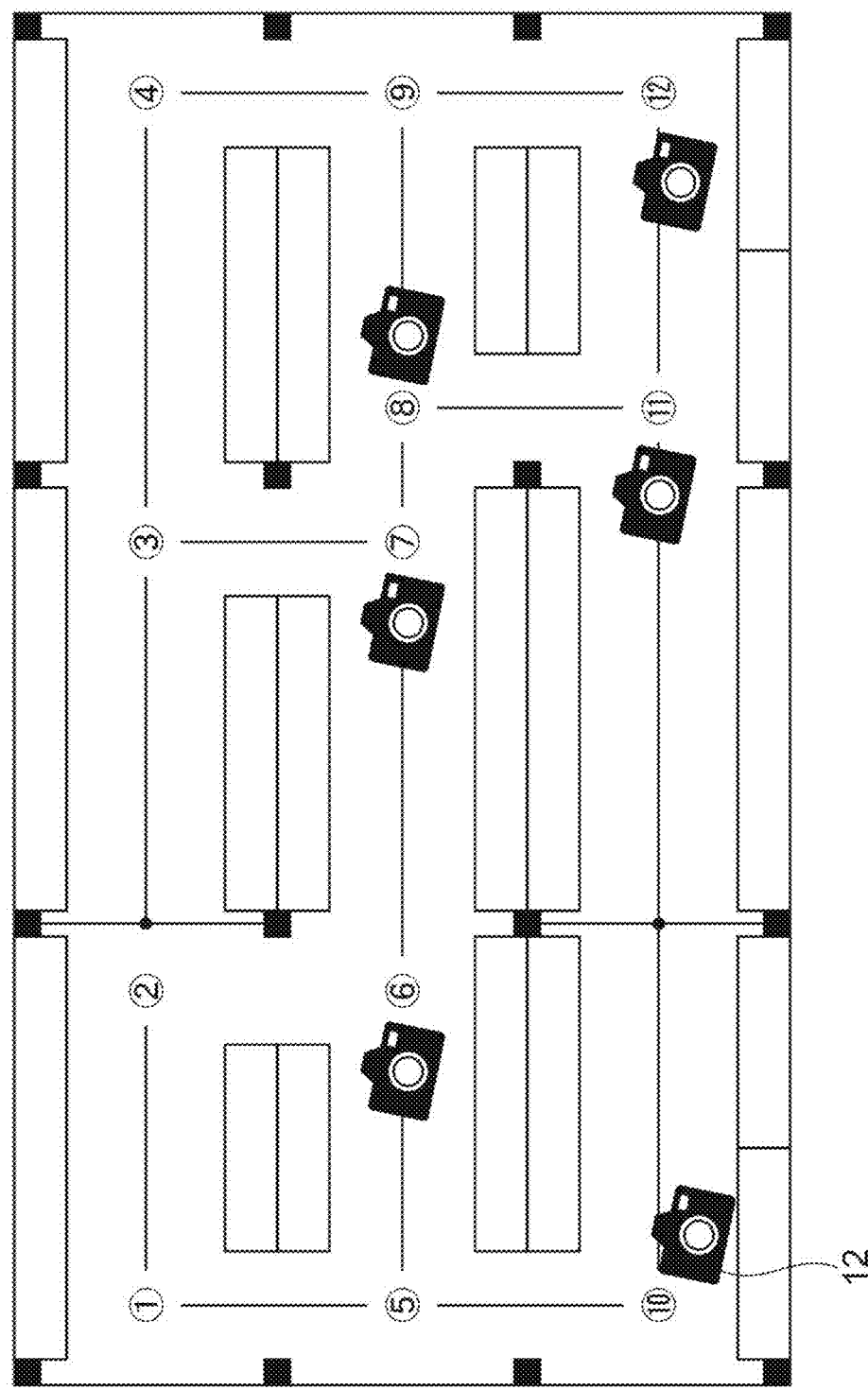
FIG. 3 is a schematic view illustrating a state of a workspace when preparing a database.

Here, the method for preparing the database will be described with reference to FIG. 3 to FIG. 6. The database is prepared in advance before the moving body 50 actually performs an operation in the workspace E while estimating the own-position. The database is prepared by acquiring an image at a point important for travel in the workspace E and by calculating information required for position estimation to be the database and to be linked to a map of the workspace E. In FIG. 3, an important point, for example, is a position numbered from "1" to "12". In the following description, a position with a number "1" will be referred to as the "first important point". Similarly, a position with the other number will be referred to as the "n-th important point". Note that, here, it is described that the moving body 50 illustrated in FIG. 2 is used for preparing the database. As described below, since the own-position estimating unit 26 has a function of extracting the feature from the image or a function of matching the images with each other, the own-position estimating unit 26 performs various processings for preparing the database. However, a device to be used for preparing the database is not particularly limited, and any device may be adopted insofar as the device is capable of executing the following processing.

Figure 4:
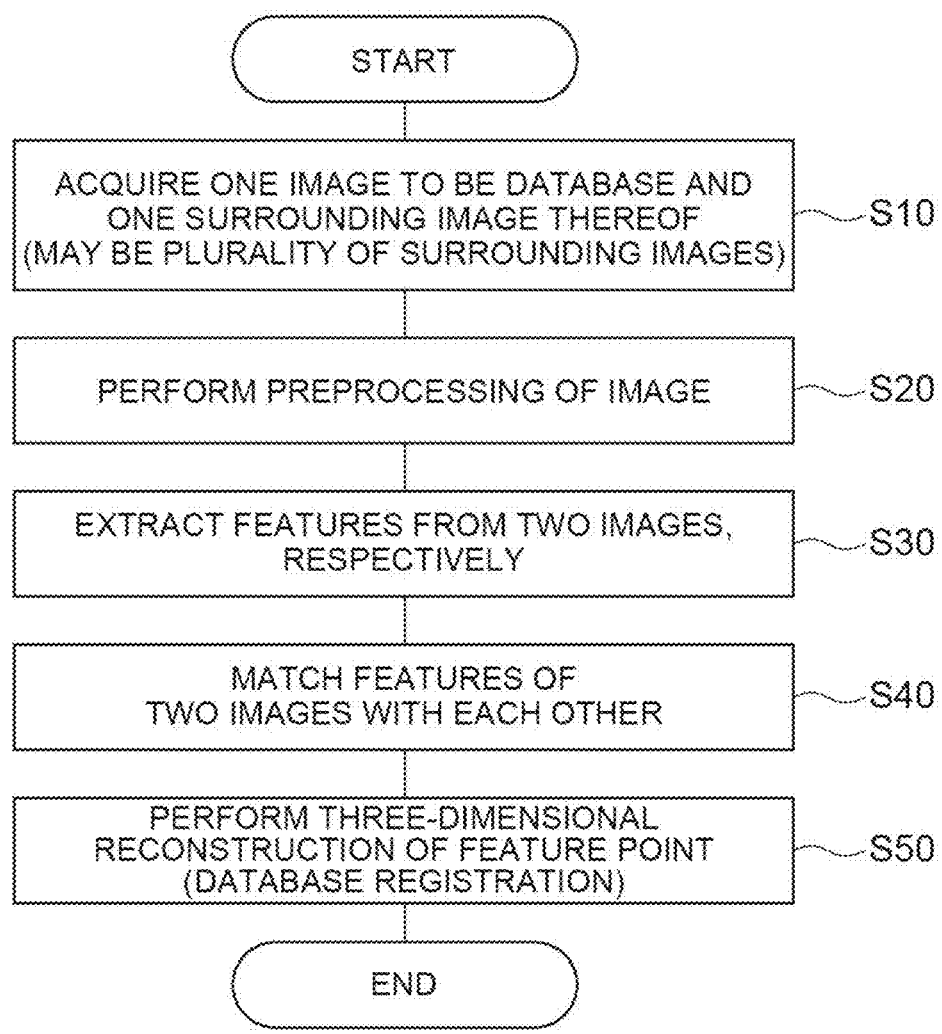
FIG. 4 is a flowchart illustrating a method for preparing the database.

FIG. 4 is a flowchart illustrating the method for preparing the database. First, the camera 12 acquires one image to be the database, and acquires one surrounding image thereof (may be plurality of surrounding images) (step S10). For example, in a case where an image at the first important point is to be the database, the camera 12 acquires one image at the first important point, and acquires another image from the vicinity of the first important point. Next, the own-position estimating unit 26 performs preprocessing of the image such that the feature can be extracted (step S20). For example, the camera 12 may include a fisheye lens such that a wide range can be photographed. In this case, since an object in the image is distorted, the image is adjusted to an image close to the actual view by performing the preprocessing.

Figure 5:
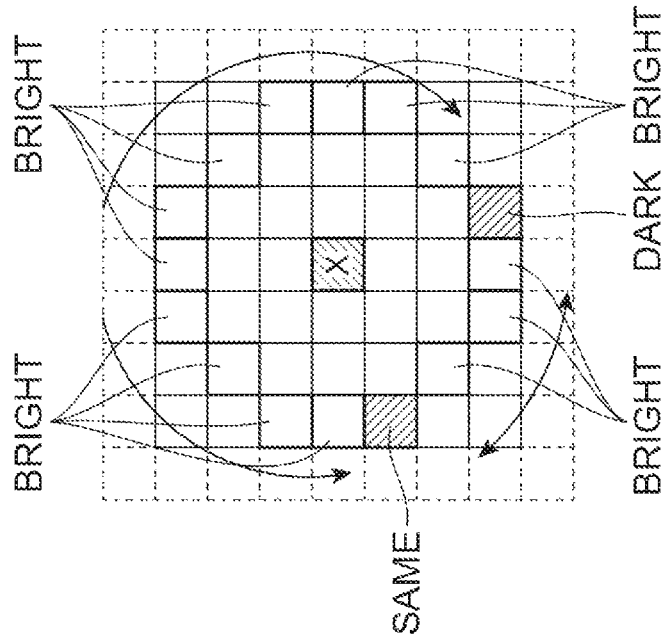
FIGS. 5(a), 5(b), and 5(c) are diagrams for illustrating a method for extracting a feature.
Figure 5:
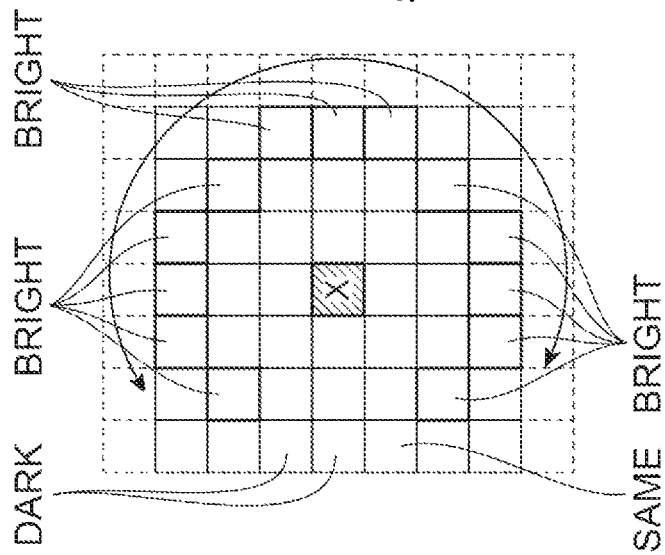
Figure 5:
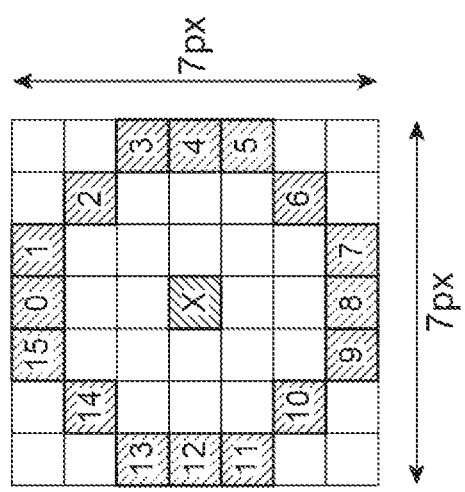

Next, the own-position estimating unit 26 extracts features from two images, respectively (step S30). Here, a method for extracting the feature in the image will be described with reference to FIG. 5. FIG. 5 is a diagram for illustrating the method for extracting the feature. As illustrated in FIG. 5(*a*), the own-position estimating unit 26 compares the luminance of a determination pixel X with the luminance of a surrounding pixel (here, 16 pixels) to be stratified into three patterns of "bright", "dark", and "same". For example, the own-position estimating unit 26 determines a surrounding pixel in which a relationship of "Determination Pixel (X)−Surrounding Pixel (i)>Light-Dark Threshold Value" is established as "bright", determines a surrounding pixel in which a relationship of "Determination Pixel (X)−Surrounding Pixel (i)<Light-Dark Threshold Value" is established as "dark", and determines a surrounding pixel in which a relationship of "Absolute Value of (Determination Pixel (X)−Surrounding Pixel (i))<Light-Dark Threshold Value" is established as "same".

Figure 6:
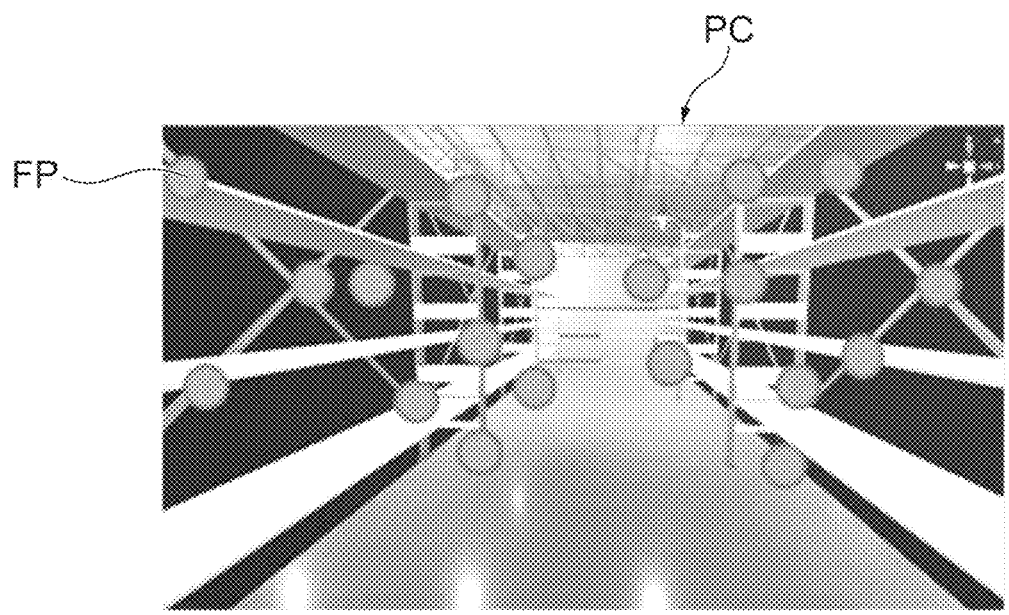
FIG. 6 is a diagram illustrating an image acquired by a camera and the extracted feature.

Here, in a case where the number of consecutive surrounding pixels of "bright" or "dark" is greater than or equal to the corner threshold value, the own-position estimating unit 26 extracts the determination pixel X as the feature in the image. For example, in a case where the corner threshold value is "12", the determination pixel X in FIG. 5(*b*) is extracted as the feature since the number of consecutive surrounding pixels of "bright" is greater than or equal to 12. The determination pixel X in FIG. 5(*c*) is discarded since the number of consecutive surrounding pixels of "bright" is only 11, and the determination pixel X is not the feature. Accordingly, as illustrated in FIG. 6, corner portions or the like of structural objects such as the shelf, the floor, the ceiling, and the wall in an image PC are extracted as the feature (a feature point FP). In addition, in a case where the cargo, the installation object, the moving body, and the like are also in the image, corner portions of such objects are also extracted as the feature.

Herein, the pixel extracted as the feature may be referred to as the "feature point FP". Note that, the feature in the image that is used in the own-position estimation may be not only a point, but also a line, a predetermined shape, and the like. That is, the feature is not limited to any mode insofar as the feature is a portion that can be extracted as a discriminative portion in the image by image processing and is a portion that can be matched with a portion extracted in the other image.

Figure 7:
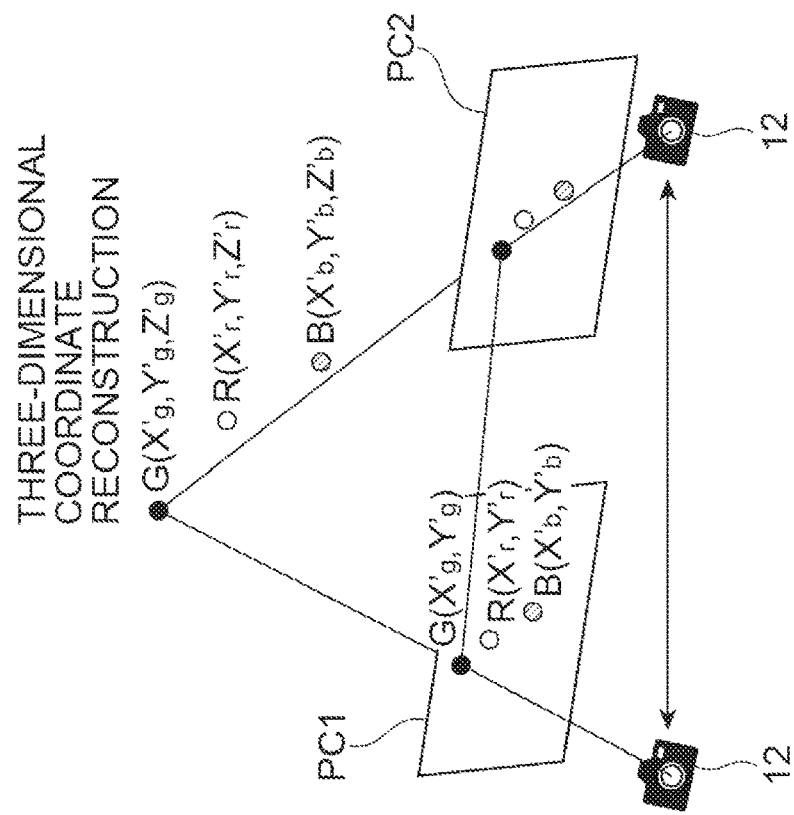
FIGS. 7(a) and 7(b) are conceptual diagrams illustrating a method for acquiring three-dimensional coordinates of the feature.

Returning to FIG. 4, the own-position estimating unit 26 matches the features of two images with each other (step S40). Then, the own-position estimating unit 26 performs three-dimensional reconstruction of the feature to be registered as the database. In the database, position information of the important point (a position in which an image is acquired), image coordinates of the feature in the image, and three-dimensional coordinates of the feature are registered by being associated with each other. Note that, in the position information, the posture of the camera 12 when photographing is also included. For example, as illustrated in FIG. 7, in an image PC1 at the important point, feature points G, R, and B are extracted, and image coordinates thereof are specified. In addition, position information of a location in which the image PC1 is acquired is also specified. In an image PC2 acquired around the important point, the feature points G, R, and B are also extracted, and the image coordinates thereof are also specified. In addition, position information of a location in which the image PC2 is acquired is also specified. A positional relationship between a surrounding photographing position and the important point is grasped by a method such as the link of an odometry value or the estimation from the image. The own-position estimating unit 26 matches the features of the image PC1 and the image PC2 with each other. Accordingly, the own-position estimating unit 26 is capable of acquiring three-dimensional coordinates of the feature points G, R, and B in the manner of triangulation.

Returning to FIG. 4, in a case where the processing of step S50 is ended, making the database of one image is ended. The moving body 50 moves to the next important point, acquires an image at the important point by the camera 12, and performs again the processing of FIG. 4. As described above, the database of images at all important points in the workspace E is made. The prepared database is stored in the storage unit 24.

Figure 8:
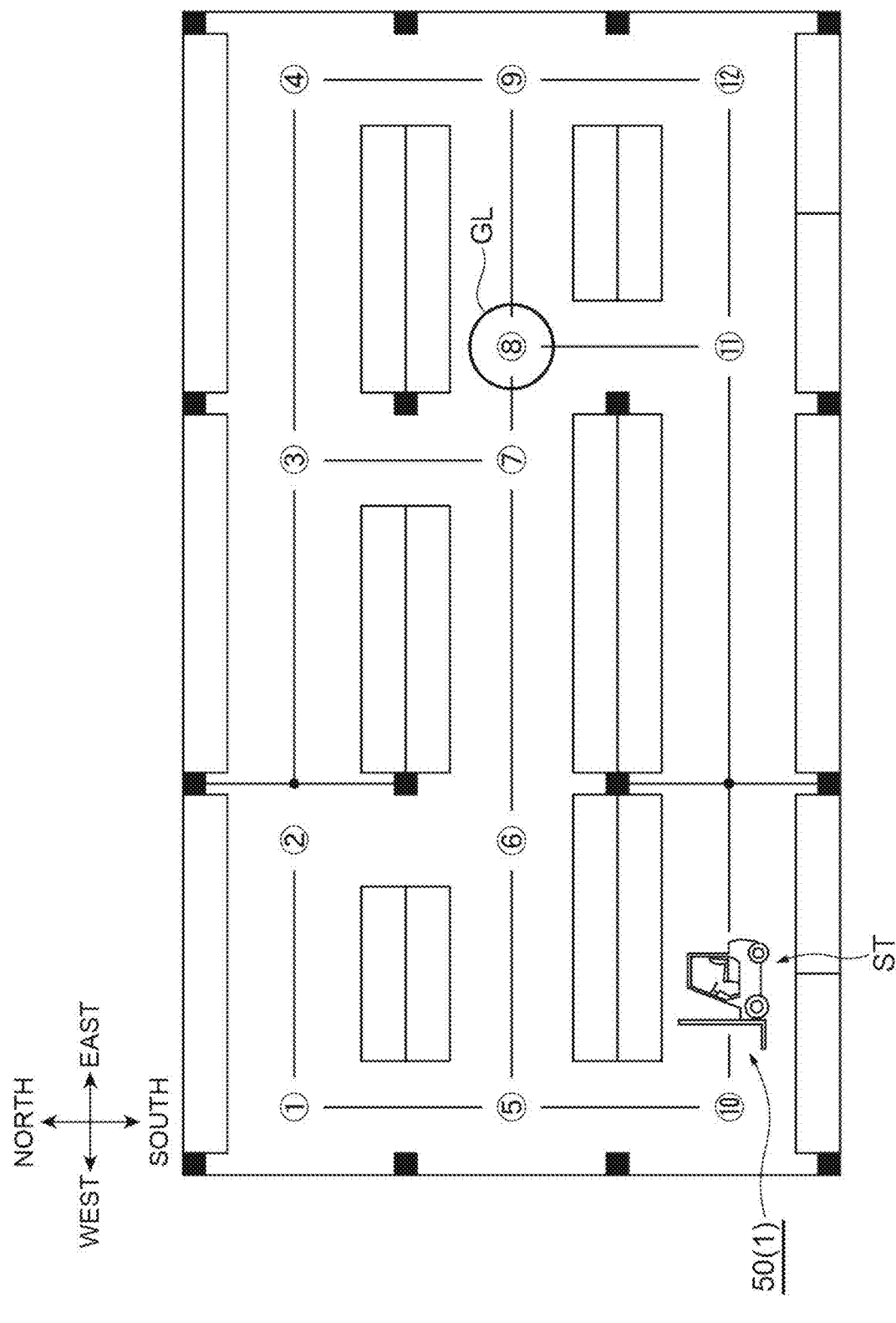
FIG. 8 is a schematic view illustrating a state when the moving body autonomously travels.

Next, a method for the moving body 50 to autonomously travel, and an own-position estimating method of the own-position estimating unit 26 for autonomous travel will be described with reference to FIG. 8 and FIG. 9. For example, the moving body 50 autonomously travels to the eighth important point that is a destination position GL from a current position ST illustrated in FIG. 8. In this case, the own-position estimating unit 26 estimates where the moving body 50 currently exists. Accordingly, the own-position deciding unit 28 is capable of deciding that the current position ST is "2 m east from the tenth important point". Then, the route planning unit 21 plans a route of "48 m east to the eleventh important point and 16 m north to the eighth important point". Accordingly, the moving body 50 autonomously travels.

Figure 9:
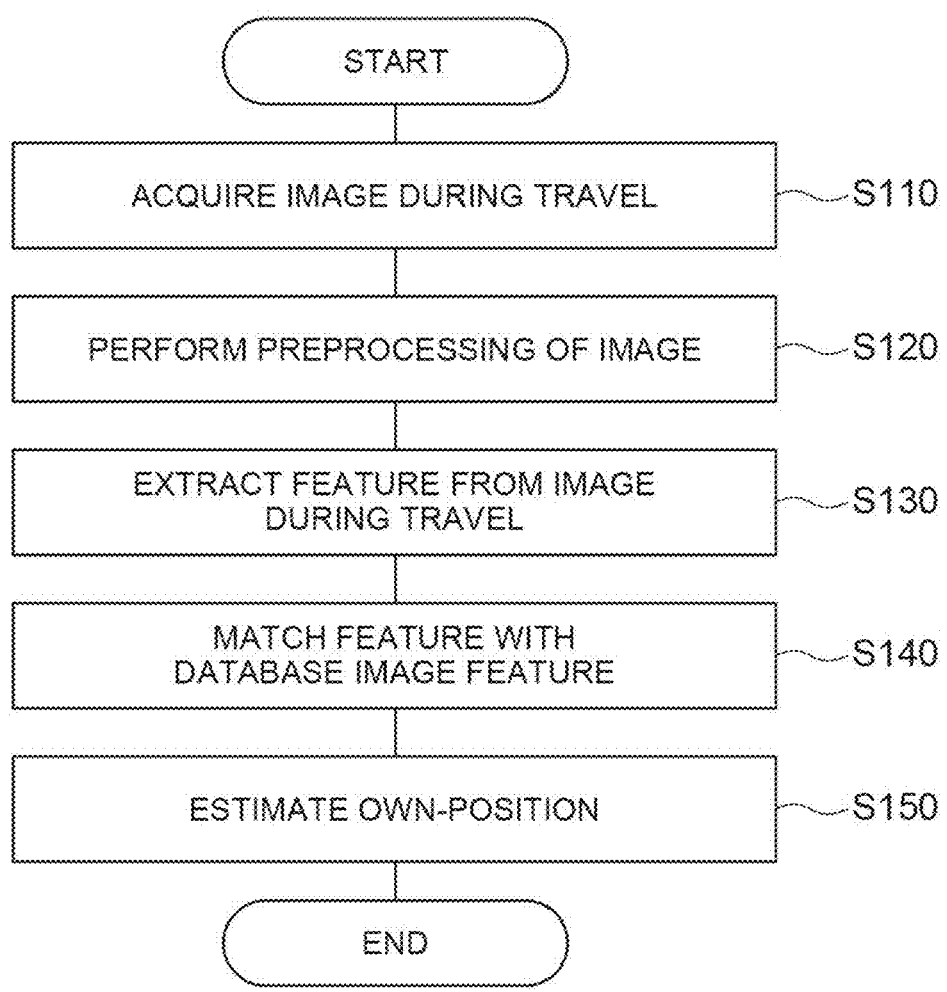
FIG. 9 is a flowchart illustrating a method for estimating the own-position of the moving body.

FIG. 9 is a flowchart illustrating a method for estimating the own-position of the moving body 50. The own-position estimating unit 26 executes processing illustrated in FIG. 9 in order to estimate the own-position of the moving body 50. As illustrated in FIG. 9, the own-position estimating unit 26 acquires an image during the travel of the moving body 50 from the camera 12 (step S110). For example, the camera 12 acquires an image in the current position ST in the vicinity of the tenth important point (refer to FIG. 8). Next, the own-position estimating unit 26 performs the preprocessing of the image such that a feature can be extracted (step S120). Next, the own-position estimating unit 26 extracts the feature from the image during the travel. Note that, in steps S120 and S130, processing to the same effect as steps S20 and S30 of FIG. 4 is performed. Accordingly, in a case where the image PC as illustrated in FIG. 6 is acquired, the feature point FP is acquired.

Next, the own-position estimating unit 26 matches the feature extracted in step S130 with the feature in the image of the database (step S140). Then, the own-position estimating unit 26 estimates the own-position of the moving body 50 (step S150).

For example, in a case where an image similar to the image PC illustrated in FIG. 6 is obtained while the moving body 50 travels, the own-position estimating unit 26 is capable of extracting a plurality of feature points FP similar to that of FIG. 6. Then, the own-position estimating unit 26 compares the feature point with the feature in the image of the database. It is assumed that the image PC illustrated in FIG. 6 is obtained at the tenth important point when preparing the database, and the plurality of feature points FP illustrated in FIG. 6 are extracted. In this case, the own-position estimating unit 26 is capable of matching the feature point extracted in step S130 with the feature point FP illustrated in FIG. 6. Note that, examples of a method for matching the feature points with each other include a method for calculating a feature amount descriptor of the feature point and for matching a feature point with the shortest distance among the feature points in the database, but the method is not particularly limited, and known methods may be used.

Here, it is assumed that the location photographed during the travel is shifted from the tenth important point, and the photographing posture during the travel is shifted from the photographing posture when preparing the database. In this case, the image photographed during the travel and the image coordinates of the feature point are slightly shifted from the image PC and the image coordinates of the feature point FP in FIG. 6. Accordingly, in step S150, the own-position estimating unit 26 links the coordinates of arbitrary three feature points from the database to three feature points in the image during the travel. Then, the own-position estimating unit 26 estimates the position and the posture of the moving body 50 by using a technology of a known three-point method. Note that, three feature points that are used in step S150 are randomly selected from a large number of feature points in the image.

Figure 10:
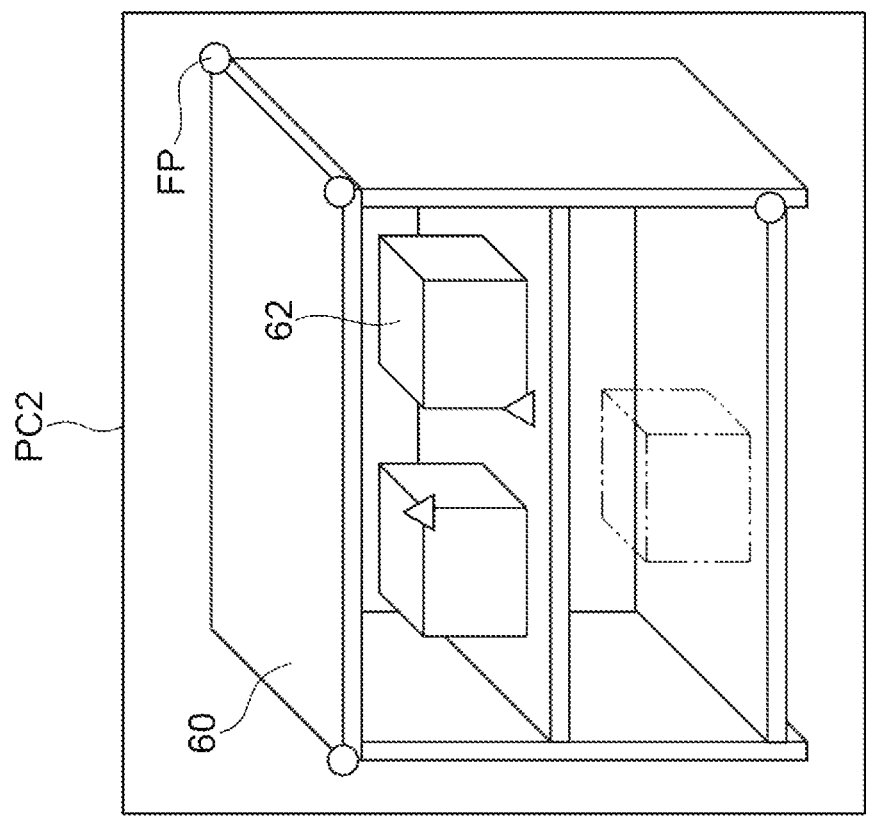
FIGS. 10(a) and 10(b) are conceptual diagrams for illustrating eligibility of a feature point.
Figure 10:
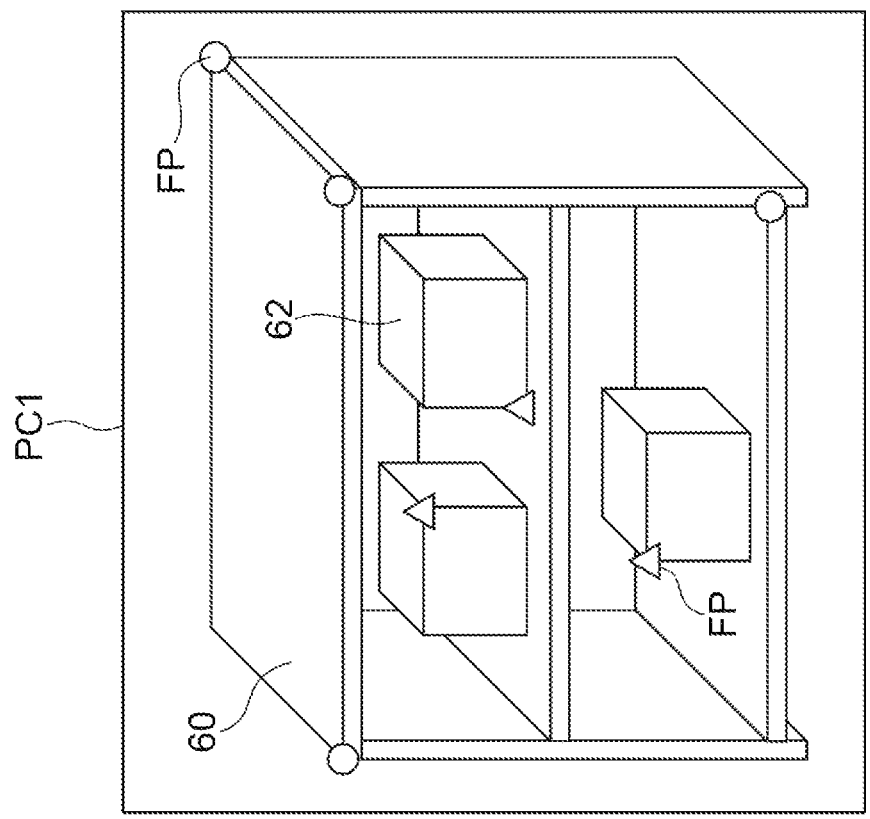
Figure 11:
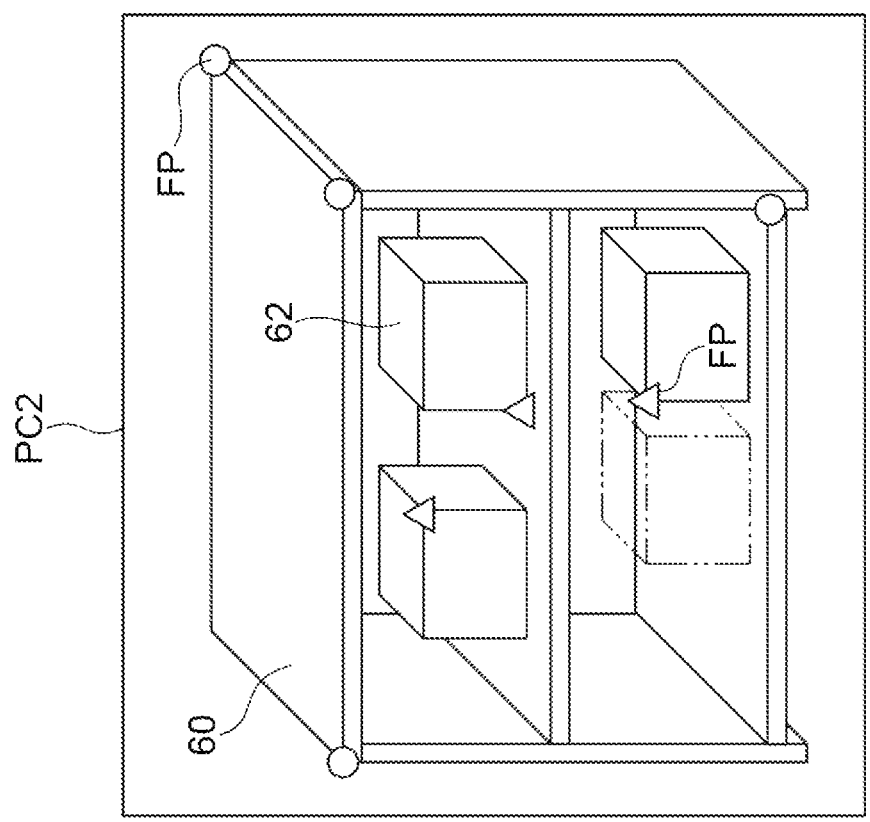
FIGS. 11(a) and 11(b) are conceptual diagrams for illustrating the eligibility of the feature point.
Figure 11:
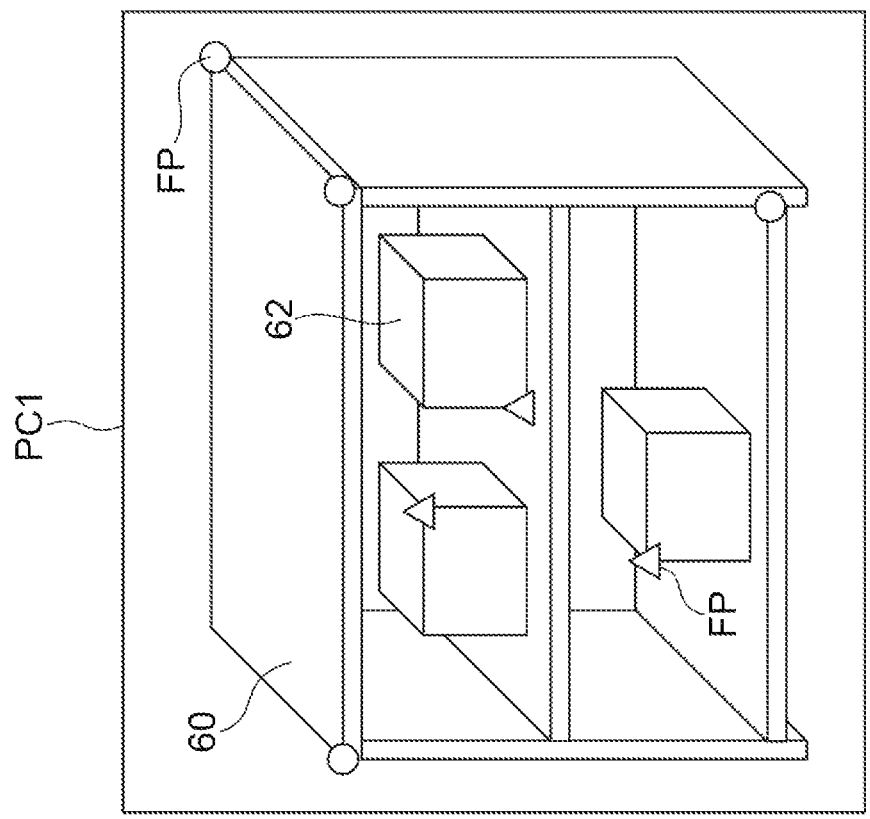

Next, the evaluating unit 31, the evaluation result acquiring unit 32, and the processing unit 33, illustrated in FIG. 2, will be described in detail. Such constituents are for processing the database such that a ratio of the features having high matching eligibility increases. That is, when preparing the database, not only the features having high eligibility but also the features having low eligibility can also be extracted in accordance with the situation of the workspace E. For example, FIG. 10(a) and FIG. 11(a) are the image PC1 and the feature point FP, which are registered in the database. As illustrated in FIG. 10(a) and FIG. 11(a), in the image PC1, there are not only the structural object such as the shelf 60 but also a movable object that moves to another location, such as a cargo 62. In this case, not only the feature point FP of the shelf 60 (a feature point represented by a circle) but also the feature point FP of the cargo 62 (a feature point represented by a triangle) are extracted. However, in the image PC2 acquired during the travel, as illustrated in FIG. 10(b), the cargo 62 may be transported to the other location, and the feature point FP may disappear. Alternatively, in the image PC2, as illustrated in FIG. 11(b), the position of the cargo 62 may be shifted in the image PC2 together with the feature point FP. As described above, since the feature point FP of the object that moves, such as the cargo 62, is highly likely to fail in the matching, it can be said that the feature point FP is the feature having low eligibility. Accordingly, the own-position estimating device 1 according to this embodiment increases the ratio of the features having high eligibility by deleting the features having low eligibility from the database.

Specifically, the evaluating unit 31 evaluates the matching eligibility of the feature in the database. The evaluating unit 31 performs the evaluation by the moving body 50 repeatedly travelling in the workspace E. The evaluating unit 31 determines whether the matching succeeds or fails for each of the features in the database, as the moving body 50 autonomously travels. Then, the evaluating unit 31 counts the number of times for success in the matching of each of the features, and evaluates the eligibility of the feature on the basis of a counting result. The evaluating unit 31 transmits an evaluation result to the evaluation result acquiring unit 32.

The evaluation result acquiring unit 32 acquires the evaluation result from the evaluating unit 31. That is, the evaluation result acquiring unit 32 acquires the evaluation result obtained by evaluating the matching eligibility of the feature in the database. The evaluation result acquiring unit 32 acquires the evaluation result obtained by the moving body 50 repeatedly travelling in the workspace E. The evaluation result acquiring unit 32 transmits the acquired evaluation result to the processing unit 33.

The processing unit 33 processes the database on the basis of the evaluation result acquired by the evaluation result acquiring unit 32. The processing unit 33 decreases a frequency that the feature evaluated to have low eligibility is used in the matching or deletes the feature from the database.

Figure 12:
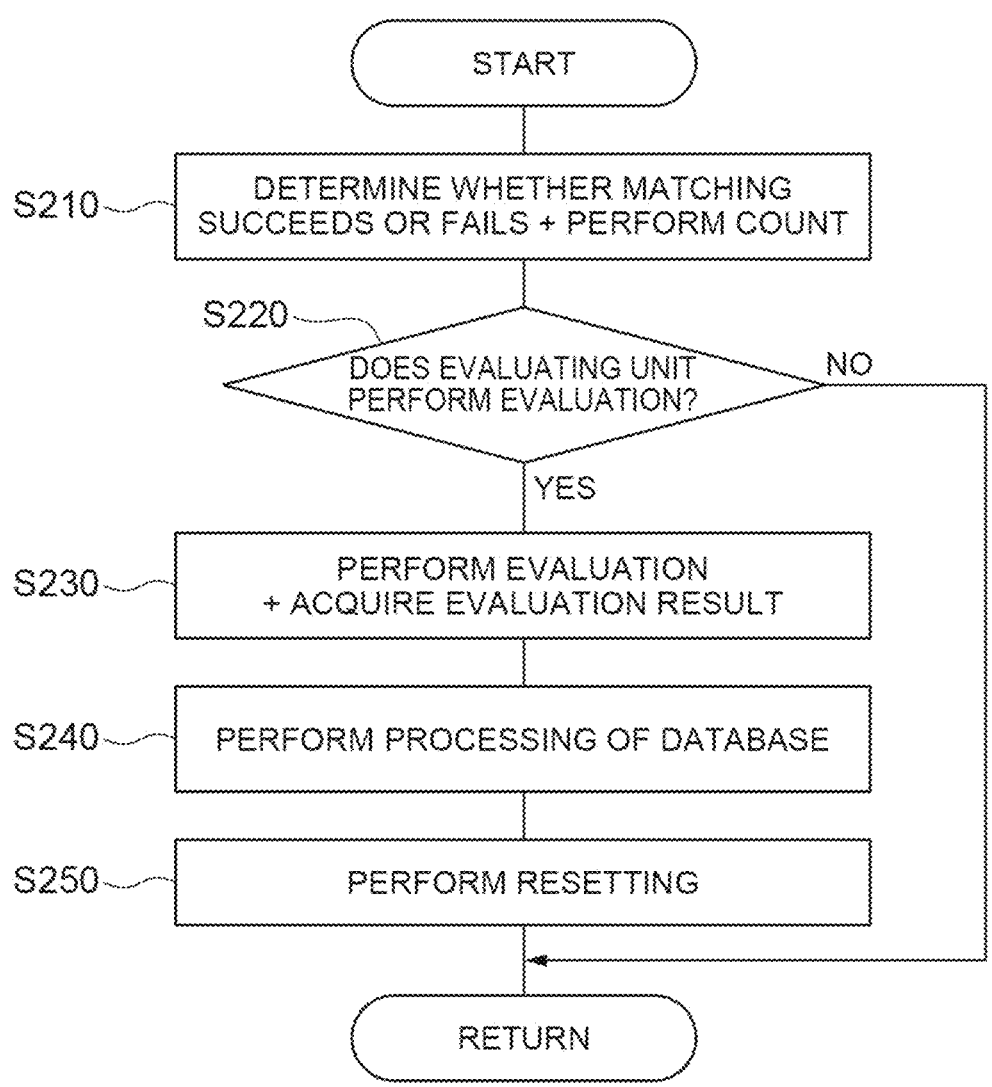
FIG. 12 is a flowchart illustrating a method for evaluating the feature in the database and for processing the database.

Next, a method for evaluating the feature in the database or for processing the database will be described with reference to FIG. 12. FIG. 12 is a flowchart illustrating the method for evaluating the feature in the database and for processing the database. Note that, in the following processing, it is assumed that the moving body 50 travels around from the first important point to the twelfth important point by autonomous travel while estimating the own-position, and autonomously travels several times. While the moving body 50 repeatedly travels around as described above, the feature in the database is evaluated and the database is processed.

First, the evaluating unit 31 evaluates the matching eligibility of the feature in the database. Specifically, as illustrated in FIG. 12, the evaluating unit 31 determines whether each of the features in the database succeeds or fails in the matching, and counts the number of times for success in the matching (step S210).

Figure 13:
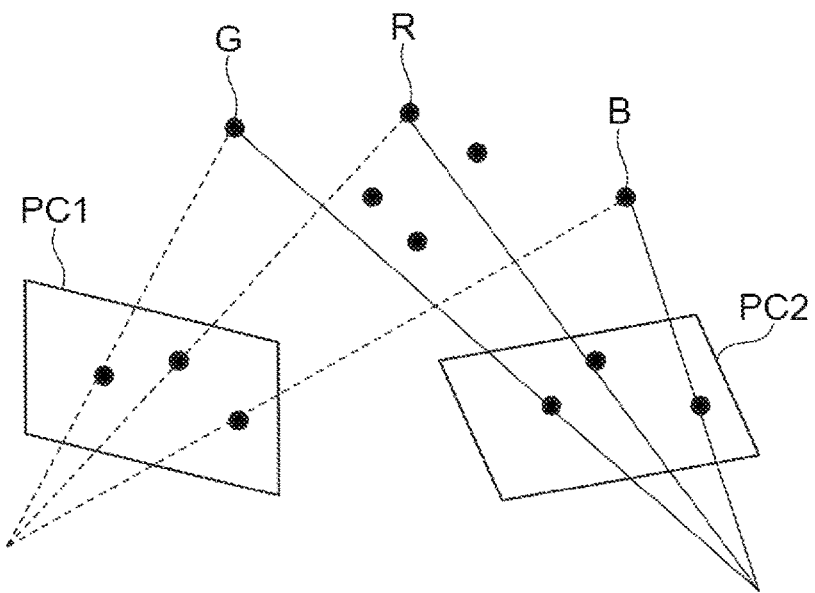
FIGS. 13(a) and 13(b) are conceptual diagrams illustrating a state when evaluating the feature point.
Figure 13:
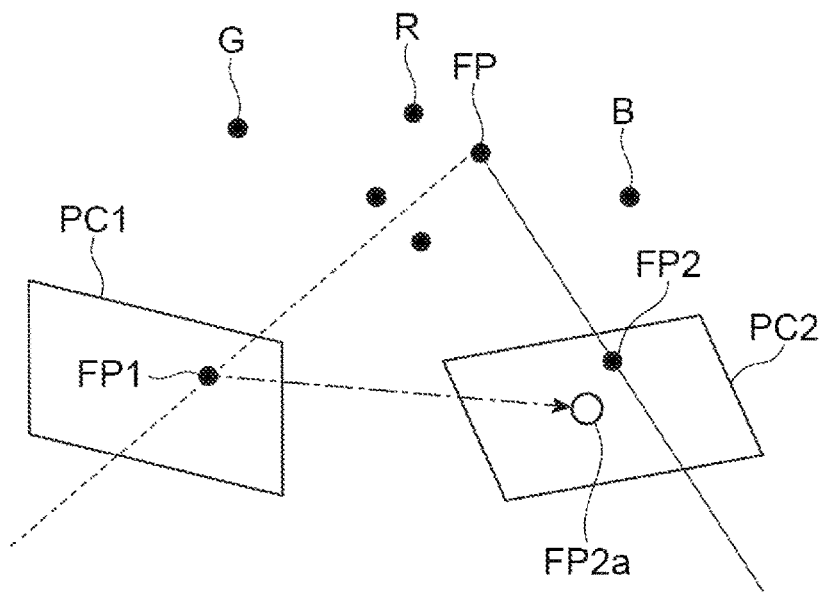

Specifically, as illustrated in FIG. 13(*a*), in a case where the own-position is estimated by the three-point method using the feature points R, G, and B, the evaluating unit 31 automatically determines whether the feature point FP other than the three feature points R, G, and B succeeds or fails in the matching. As illustrated in FIG. 13(*b*), when determining whether the feature point FP other than the three feature points R, G, and B succeeds or fails in the matching, the feature point FP to be determined is represented by a "feature point FP1" in the image coordinates of the image PC1 of the database, and the feature point FP to be determined is represented by a "feature point FP2" in the image coordinates of the image PC2 during the travel. The evaluating unit 31 reprojects a three-dimensional coordinate point of the feature point FP1 onto the image PC2. The reprojected feature point FP1 is represented by a "feature point FP2*a*" in the image coordinates of the image PC2. The evaluating unit 31 acquires the size of an error between the feature point FP2*a* and the feature point FP2, and determines whether or not the error is less than or equal to a threshold value. In a case where the error is less than or equal to the threshold value, the evaluating unit 31 determines that the feature point FP to be determined succeeds in the matching, thereby increasing the count of the number of times for success in the matching of the feature point by one. On the other hand, in a case where the error is greater than the threshold value, the evaluating unit 31 determines that the feature point FP to be determined fails in the matching, thereby not counting the number.

Here, FIGS. 14(*a*) to 14(*d*) are graphs illustrating the number of times for success in the matching of each of the feature points FP in the database. In FIGS. 14(*a*) to 14(*d*), the number of times that the moving body 50 travels around the workspace E is different. Note that, in FIGS. 14(*a*) to 14(*d*), a horizontal axis indicates the order of identification numbers that are arbitrarily given to the feature points in the database. In FIGS. 14(*a*) to 14(*d*), a vertical axis indicates the number of times for success in the matching. In FIGS. 14(*a*) to 14(*d*), the feature point FP having high eligibility is represented by a circle as in FIG. 10 and FIG. 11, and the feature point FP having low eligibility, such as the cargo, is represented by a triangle. Whenever the moving body 50 travels around the workspace E, it is determined whether each of the feature points FP in the database succeeds or fails in the matching. Accordingly, as illustrated in FIGS. 14(*a*) to 14(*c*), as the moving body 50 travels around, the number of times for success in the matching of the feature point FP having high eligibility tends to increase, and the number of times for success in the matching of the feature point FP having low eligibility tends not to increase. Note that, for description purpose, the feature point FP having high eligibility and the feature point FP having low eligibility are distinguished by a circle and a triangle, but in the actual processing, both of the feature points FP are not distinguished. Note that, FIGS. 14(*a*) to 14(*d*) illustrate only a part of the feature points FP in the database, but in the actual database, a larger number of feature points FP are registered.

Returning to FIG. 12, next, the evaluating unit 31 determines whether or not to evaluate the eligibility of the feature in the database (step S220). As a determination condition, the number of time that the moving body 50 travels around may be set. For example, whenever the moving body 50 travels around the workspace E 10 times, the evaluation may be performed. In step S220, in a case where it is determined not to perform the evaluation, the processing illustrated in FIG. 12 is ended, and the processing is started again from step S210.

In step S220, in a case where it is determined to perform the evaluation, the evaluating unit 31 performs the evaluation, and the evaluation result acquiring unit 32 acquires the evaluation result (step S230). Accordingly, the evaluating unit 31 acquires the evaluation result obtained by evaluating the matching eligibility of the feature in the database. The evaluating unit 31, for example, determines whether or not the number of times for success in the matching of each of the feature points FP is greater than or equal to a threshold value TH, as illustrated in FIG. 14(*c*), thereby performing the evaluation. The evaluating unit 31 evaluates that the feature point FP of which the number of times for success in the matching is less than the threshold value TH as the feature point FP having low matching eligibility.

The processing unit 33 processes the database on the basis of the evaluation result acquired in step S230 (step S240). The processing unit 33, for example, as illustrated in FIG. 14(*c*), deletes the feature point FP of which the number of times for success in the matching is less than the threshold value TH (the feature point FP in a region indicated by a dashed-two dotted line) from the database.

Next, the evaluating unit 31 processes the database in step S240, and then, resets the count of the number of times for success in the matching of the remaining feature points FP (step S250). Accordingly, it is easy to respond to a change in the situation of the workspace E. For example, the number of times for success in the matching of the feature point FP of a cargo that has been left on the shelf for a long period of time extremely increases even though the feature point FP has low eligibility. After the cargo is removed from the shelf, the count number of the feature point FP corresponding to the cargo does not increase, but the deletion of the feature point FP from the database may be delayed due to the influence of a number of times for success in the matching in the past. In contrast, it is possible to rapidly delete the feature point FP corresponding to the cargo removed from the shelf when processing the next database by periodically resetting the number of times for success in the matching. After step S250 is ended, the processing illustrated in FIG. 12 is ended, and the processing is started again from step S210.

Next, the function and effect of the own-position estimating device, the moving body, the own-position estimating method, and an own-position estimating program according to this embodiment will be described.

The own-position estimating device 1 is for estimating the own-position of the moving body 50 by matching the feature extracted from the acquired image with the database in which the position information and the feature are associated with each other in advance. Here, not only the features of an immobile structural object such as the shelf 60, but also the features of the movable object such as the cargo 62 may be extracted when preparing the database in advance. In contrast, the evaluation result acquiring unit 32 acquires the evaluation result obtained by evaluating the matching eligibility of the feature in the database. Accordingly, even in a case where the feature having low eligibility, as with the feature of the movable object such as the cargo 62, is included in the database, the evaluation result acquiring unit 32 is capable of acquiring the evaluation result obtained by evaluating that such a feature has low eligibility. Further, the processing unit 33 is capable of processing the database on the basis of the evaluation result acquired by the evaluation result acquiring unit 32. That is, the processing unit 33 is capable of processing the database such that the matching is easily performed by the features having high eligibility. As described above, the accuracy of the own-position estimation can be improved.

The own-position estimating device 1 may further include the camera 12 acquiring the image, the own-position estimating unit 26 estimating the own-position of the moving body by extracting the feature from the image acquired by the camera 12 and by matching the extracted feature with the database, and the evaluating unit 31 evaluating the matching eligibility of the feature in the database. Accordingly, the own-position estimating device 1 extracts and evaluates the feature on the basis of the image acquired by the own camera 12, and is capable of processing the database.

The evaluation result acquiring unit 32 acquires the evaluation result obtained by the moving body 50 repeatedly travelling in the workspace E. Accordingly, it is possible for the processing unit 33 to process the database by the moving body 50 repeatedly travelling. Accordingly, it is possible to automatically improve the accuracy of the own-position estimation when the moving body 50 travels.

The processing unit 33 deletes the feature evaluated to have low eligibility from the database. As a result thereof, the ratio that the feature having high eligibility is used in the matching increases.

For example, an experiment of processing the database by the method illustrated in FIG. 14 in a state where the number of feature points corresponding to the movable object and the number of feature points corresponding to the structural object that does not move are grasped in advance was conducted. As a result thereof, there were 458 feature points in the database and a ratio of the feature points corresponding to the structural object was 53% when preparing the database, but there were 217 feature points in the database and the ratio of the feature points corresponding to the structural object was 88% at the 200-th time. As described above, a database with a high ratio of the feature points having high eligibility was obtained.

The moving body 50 according to this embodiment includes the own-position estimating device 1 described above.

The own-position estimating method according to this embodiment is an own-position estimating method for estimating the own-position of the moving body 50 by matching the feature extracted from the acquired image with the database in which the position information and the feature are associated with each other in advance, the method including: an evaluation result acquisition step of acquiring the evaluation result obtained by evaluating the matching eligibility of the feature in the database; and a processing step of processing the database on the basis of the evaluation result acquired in the evaluation result acquisition step.

The own-position estimating program according to this embodiment is an own-position estimating program for estimating the own-position of the moving body by matching the feature extracted from the acquired image with the database in which the position information and the feature are associated with each other in advance, the program allowing the controller to execute: an evaluation result acquisition step of acquiring the evaluation result obtained by evaluating the matching eligibility of the feature in the database; and a processing step of processing the database on the basis of the evaluation result acquired in the evaluation result acquisition step.

According to the moving body 50, the own-position estimating method, and the own-position estimating program, it is possible to obtain the same effects as those of the own-position estimating device 1 described above.

The present disclosure is not limited to the embodiment described above.

For example, the evaluation result acquiring unit 32 may acquire the evaluation result obtained by machine learning. In this case, even in a case where the moving body does not actually travel repeatedly, the processing unit 33 is capable of rapidly processing the database. For example, the evaluating unit 31 may perform the machine learning by using the evaluation result obtained by the repeated travel in the workspace E as learning data. In this case, it is possible to prepare a learning data set without using manpower. For example, in a case where the own-position estimating device 1 that has performed the machine learning in a certain workspace is imported into the next workspace, the evaluating unit 31 is capable of rapidly processing the database after preparing the database, without repeating again the travel.

Note that, in the embodiment described above, the processing unit 33 may perform processing of deleting the feature evaluated to have low eligibility from the database.

Alternatively, the processing unit 33 may perform processing of decreasing the frequency that the feature evaluated to have low eligibility is used in the matching. For example, when three feature points are randomly selected for the matching, the probability of selecting the feature point having low eligibility may be decreased. As described above, in a case where the feature points evaluated to have low eligibility remain without being completely deleted, the feature points can be used as the feature point when the feature points have high eligibility at the other time. This is because, for example, even the feature point having high eligibility may temporarily have low eligibility by being hidden or difficult to see due to a barrier or the sunlight.

In the embodiment described above, the database is prepared in a state where the cargo 62 is placed on the shelf 60. As described above, by using the own-position estimating device 1 of the present disclosure, it is possible to increase the accuracy of the database even in a case where the cargo 62 is not removed from the shelf 60. However, the own-position estimating device 1 of the present disclosure is effective in a state where the cargo 62 is removed from the workspace E. This is because, for example, a metallic mesh or the like may be extracted as the feature point or not even though the metallic mesh or the like is the structural object, and there may be the features having low eligibility. In addition, this is because an operator or the other moving body may be temporarily photographed when preparing the database.

In the embodiment described above, all the constituents of the own-position estimating device are included in the moving body 50. Alternatively, the managing unit 2 may have a part of the functions of the own-position estimating device. For example, the managing unit 2 may include the evaluation result acquiring unit 32 and the processing unit 33. In this case, each of the moving bodies 50 may evaluate the workspace E, and the managing unit 2 may collectively reflect the evaluation results thereof on the processing of the processing unit 33. In this case, the managing unit 2 also functions as the own-position estimating device. Note that, in a case where the managing unit 2 functions as the own-position estimating device, the term "own" is based on the moving body 50 to be estimated but not the managing unit 2.

REFERENCE SIGNS LIST

1: own-position estimating device, 12: camera (image acquiring unit), 26: own-position estimating unit (extracting unit, estimating unit), 31: evaluating unit, 32: evaluation result acquiring unit, 33: processing unit, 50: moving body.

The invention claimed is:

1. An own-position estimating device for estimating an own-position of a moving body by matching a feature point extracted from an acquired image with a database in which position information and the feature point are associated with each other in advance, the device comprising:
an electronic control unit (ECU), including a central processing unit that executes a program stored in a memory, configured to:
prepare the database in advance, before the moving body performs an operation in a predetermined region, by performing a three-dimensional reconstruction of three features and associating each of the position information, image coordinates of the three features, and three-dimensional coordinates of the three features with each other in in the database;
acquire an evaluation result obtained by evaluating matching eligibility of the feature point in the database; and
process the database on the basis of the evaluation result,
wherein the evaluation result is obtained by:
the moving body repeatedly travelling in the predetermined region after the database is prepared,
repeatedly matching the feature point, other than the three features, obtained during the travel of the moving body with the feature point in the database and determining whether each of the matching succeeds or fails, and
counting the number of times of success in the matching, and
wherein the ECU deletes the feature point from the database when the number of times of success in the matching is below a predetermined threshold.

2. The own-position estimating device according to claim 1, further comprising:
a camera that acquires the image;
wherein the ECU is further configured to:
extract the feature point from the image;
estimate the own-position of the moving body by matching the feature point with the database; and
evaluate the matching eligibility of the feature point in the database.

3. The own-position estimating device according to claim 1,
wherein the ECU acquires the evaluation result obtained by machine learning.

4. A moving body, comprising:
the own-position estimating device according to claim 1.

5. An own-position estimating method for estimating an own-position of a moving body by matching a feature point extracted from an acquired image with a database in which position information and the feature point are associated with each other in advance, the method comprising:
a database preparation step, before the moving body performs an operation in a predetermined region, of performing a three-dimensional reconstruction of three features and associating each of the position information, image coordinates of the three features, and three-dimensional coordinates of the three features with each other in in the database;
an evaluation result acquisition step of acquiring an evaluation result obtained by evaluating matching eligibility of the feature point in the database; and
a processing step of processing the database on the basis of the evaluation result acquired in the evaluation result acquisition step,
wherein the evaluation result is obtained by:
the moving body repeatedly travelling in the predetermined region after the database is prepared,
repeatedly matching the feature point, other than the three features, obtained during the travel of the moving body with the feature point in the database and determining whether each of the matching succeeds or fails, and
counting the number of times of success in the matching, and
wherein the processing step includes deleting the feature point from the database when the number of times of success in the matching is below a predetermined threshold.

6. An own-position estimating program embodied on a non-transitory computer-readable storage medium, for estimating an own-position of a moving body by matching a feature point extracted from an acquired image with a database in which position information and the feature point are associated with each other in advance, the program allowing a controller to execute:
- a database preparation step, before the moving body performs an operation in a predetermined region, of performing a three-dimensional reconstruction of three features and associating each of the position information, image coordinates of the three features, and three-dimensional coordinates of the three features with each other in in the database;
- an evaluation result acquisition step of acquiring an evaluation result obtained by evaluating matching eligibility of the feature point in the database; and
- a processing step of processing the database on the basis of the evaluation result acquired in the evaluation result acquisition step,
- wherein the evaluation result is obtained by:
  - the moving body repeatedly travelling in the predetermined region after the database is prepared,
  - repeatedly matching the feature point, other than the three features, obtained during the travel of the moving body with the feature point in the database and determining whether each of the matching succeeds or fails, and
  - counting the number of times of success in the matching, and
- wherein the processing step includes deleting the feature point from the database when the number of times of success in the matching is below a predetermined threshold.

* * * * *